(12) United States Patent
Hilarides et al.

(10) Patent No.: US 10,066,189 B2
(45) Date of Patent: Sep. 4, 2018

(54) COMPOSITIONS AND METHODS FOR CLEANING MEMBRANES

(71) Applicants: Jim J. Hilarides, Mount Pleasant, WI (US); Dilon Richard Grammentz, Milwaukee, WI (US)

(72) Inventors: Jim J. Hilarides, Mount Pleasant, WI (US); Dilon Richard Grammentz, Milwaukee, WI (US)

(73) Assignee: HYDRITE CHEMICAL CO., Brookfield, WI (US)

( * ) Notice: Subject to any disclaimer, the term of this patent is extended or adjusted under 35 U.S.C. 154(b) by 0 days.

(21) Appl. No.: 14/819,185

(22) Filed: Aug. 5, 2015

(65) Prior Publication Data

US 2017/0037339 A1 Feb. 9, 2017

(51) Int. Cl.
| | |
|---|---|
| *C11D 1/72* | (2006.01) |
| *C11D 1/825* | (2006.01) |
| *C11D 3/43* | (2006.01) |
| *B08B 3/04* | (2006.01) |
| *B08B 9/08* | (2006.01) |
| *B01D 65/02* | (2006.01) |
| *C11D 3/20* | (2006.01) |
| *C11D 3/34* | (2006.01) |
| *C11D 3/36* | (2006.01) |

(52) U.S. Cl.
CPC ............. *C11D 1/72* (2013.01); *B01D 65/02* (2013.01); *C11D 1/8255* (2013.01); *C11D 3/2079* (2013.01); *C11D 3/3409* (2013.01); *C11D 3/3418* (2013.01); *C11D 3/362* (2013.01); *C11D 3/43* (2013.01); *B01D 2321/168* (2013.01)

(58) Field of Classification Search
CPC .. C11D 1/72; C11D 1/825; C11D 3/43; B08B 3/04; B08B 9/08
See application file for complete search history.

(56) References Cited

U.S. PATENT DOCUMENTS

| | | |
|---|---|---|
| H1818 H | 11/1999 | Potgieter et al. |
| 2009/0200234 A1 | 8/2009 | Schacht et al. |
| 2011/0212870 A1 | 9/2011 | Lant |
| 2014/0274857 A1* | 9/2014 | Schacht ................. C11D 1/662 510/234 |

\* cited by examiner

*Primary Examiner* — Brian P Mruk
(74) *Attorney, Agent, or Firm* — Quarles & Brady LLP

(57) ABSTRACT

A composition is disclosed for cleaning a membrane. The composition includes: (i) a non-ionic surfactant having the formula: $R-O(CH_2CH_2O)_nH$, wherein R is a branched, substituted or unsubstituted, $C_{11-15}$ alkyl group, wherein n is an average degree of ethoxylation, and wherein n is in the range of from 3 to 20; and (ii) at least one of an additional non-ionic surfactant, a water soluble solvent, or a hydrotrope. In one version of the composition, an upper limit of a range of molecular weights of the surfactant is 1300 grams or below. In another version of the composition, the composition has a gel point such that it will be in the liquid phase before and after dilution with any amount of water at all temperatures of 40° F. and above. A method of cleaning a membrane using the compositions is also disclosed.

36 Claims, 4 Drawing Sheets

COMPOSITIONS AND METHODS FOR CLEANING MEMBRANES

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The invention relates to compositions and methods for cleaning membranes used in separation facilities, such as facilities that clarify, concentrate and/or fractionate a variety of dairy products. The cleaning compositions can remove protein, fat, minerals, and other feed stream components, and offer an environmentally friendly alternative surfactant system to nonylphenol ethoxylates.

2. Description of the Related Art

The separation of dairy fluids using semi-permeable membranes has been used to clarify, concentrate and/or fractionate a variety of dairy products. However, membrane performance may decrease during processing of milk, whey, and other feed streams due to the fouling of the membrane surface or membrane pores by protein, fat, minerals, and other feed stream components. Fouling leads to a decline in flux with time of operation. Flux decline is typically a reduction in permeation flow or permeation rates that occurs when all operating parameters, such as pressure, feed flow rate, temperature, and feed concentration are kept constant. Membrane fouling is a complicated process and is believed to occur due to a number of factors including electrostatic attraction, hydrophobic and hydrophilic interactions, and the deposition and accumulation of feed components on the membrane surface and/or within the pores of the membrane. It is expected that almost all feed components will foul membranes to a certain extent. Fouling components and deposits can include inorganic salts, particulates, microbials and organics.

Filtration membranes typically require periodic cleaning to allow for successful use within separation facilities such as those found in the dairy industry. The filtration membranes can be cleaned by removing foreign material from the surface and body of the membrane and associated equipment. The cleaning procedure for filtration membranes can involve a clean-in-place process where cleaning agents are circulated over the membrane to wet, penetrate, dissolve and/or rinse away foreign materials from the membrane.

Nonylphenol ethoxylates (NPE) have played an important role in the cleaning and performance efficiency of membrane filtration systems utilized in dairy applications. NPE 9 (9 mole ethoxylate of nonyl phenol) and other phenol ethoxylates have been the standard surfactant used in the cleaning of most membrane systems. Membrane systems that have poor or unoptimized rinses can leave traces of surfactants behind. These surfactants can then become part of the product during processing. To verify potential surfactant contamination, testing of rinse waters will indicate if particular system has a problem with residual NPE.

Nonylphenols have been shown to be bio-accumulators and endocrine disruptors leading to pressure on NPE's by regulatory bodies in both the United States and the European Union. Current restrictions in place in the European Union has set a limit of 10 ppb in fractions from whey and milk separation. In the United States, starting in 2015 all manufacturers with have to report all quantities of NPE utilized.

Due to these restrictions, dairy producers are looking for alternative surfactant chemistries that provide the same cleaning performance as ethoxylated nonylphenols without the drawbacks that are associated with NPE's. Typically, alkylphenol ethoxylates have been components in cleaning formulations or additives to a cleaning program. These surfactants serve a twofold purpose; wetting surfaces and emulsification of dairy soils that typically build on membrane surfaces, and maintaining hydrophilic membrane surfaces to maintain flux efficiency. It is difficult to reproduce these properties with surfactants other than alkylphenol ethoxylates.

Thus, there exists a need for alternative surfactant technologies that do not suffer from the regulatory restrictions that plague nonylphenol ethoxylates and have acceptable performance with regards to membrane compatibility and membrane cleaning performance.

SUMMARY OF THE INVENTION

The present invention addresses the foregoing needs by providing a membrane cleaning composition and method that use alternative surfactant technologies that do not suffer from the regulatory restrictions that plague nonylphenol ethoxylates and have shown to have acceptable performance with regards to membrane compatibility and cleaning performance. The present invention is the discovery of a composition including one or more surfactants that provide similar performance when compared to nonylphenol ethoxylates, but are biodegradable and unregulated.

The invention provides a composition for cleaning a membrane. The composition comprises: (i) a non-ionic surfactant having the formula: $R—O(CH_2CH_2O)_nH$, wherein R is a branched, substituted or unsubstituted, $C_{11-15}$ alkyl group, wherein n is an average degree of ethoxylation, wherein n is in the range of from 3 to 20, and wherein an upper limit of a range of molecular weights of the surfactant is 1300 grams or below; and (ii) at least one of the following: an additional non-ionic surfactant, a water soluble solvent, or a hydrotrope. In one version of the composition, R is a 100% branched, unsubstituted, $C_{13}$ alkyl group, and n is in the range of from 8 to 10. In one version of the composition, a cloud point of the composition is in a range of 110° F. to 140° F. In one version of the composition, the non-ionic surfactant has a distribution of ethoxylation having an upper limit of 20 moles.

In one version of the composition, the non-ionic surfactant is present in the composition at a level of from about 20 wt. % to about 90 wt. %, wherein all weight percentages are percent by weight of the total composition.

The composition may comprise one or more additional non-ionic surfactants, each additional non-ionic surfactant may have the Formula (I)

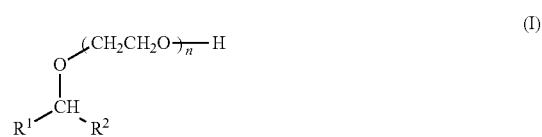

wherein n is an average degree of ethoxylation, wherein n is in the range of from 3 to 40, wherein $R^1$ is linear or branched, substituted or unsubstituted, saturated or unsaturated $C_1$-$C_{13}$ alkyl, wherein $R^2$ is linear or branched, substituted or unsubstituted, saturated or unsaturated $C_1$-$C_{13}$ alkyl, and wherein the total number of carbon atoms present in the $R^1$ and $R^2$ moieties is in the range of from 11 to 15. Each additional non-ionic surfactant may have the formula: $C_{11-15}H_{23-31}O(CH_2CH_2O)_nH$, wherein n is in the range of from 6 to 10. Each additional non-ionic surfactant may have the Formula (II) below:

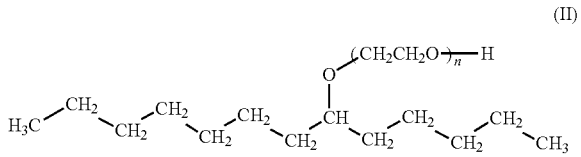

(II)

wherein n is in the range of from 6 to 10.

In one version of the composition, the composition includes two additional different non-ionic surfactants having the Formula (II) below:

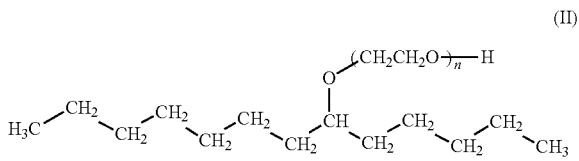

(II)

wherein n is in the range of from 6 to 10.

The one or more additional non-ionic surfactants may be present in the composition at a level of from about 10 wt. % to about 50 wt. %, wherein all weight percentages are percent by weight of the total composition.

In one version of the composition, the composition comprises a water soluble solvent. The solvent may be selected from the group consisting of $C_1$ to $C_6$ monohydric alcohols, $C_1$ to $C_6$ diols, alkylene glycols, $C_3$ to $C_{24}$ alkylene glycol ethers, and mixtures thereof. The solvent may be an alkylene glycol. The solvent may be present in the composition at a level of from about 5 wt. % to about 50 wt. %, wherein all weight percentages are percent by weight of the total composition.

In one version of the composition, the composition comprises a hydrotrope. The hydrotrope may be selected from the group consisting of sodium, potassium or ammonium salts of xylene sulfonate, sodium, potassium or ammonium salts of cumene sulfonate, sodium, potassium or ammonium salts of toluene sulfonate, sodium, potassium or ammonium salts of alkyl naphthalene sulfonates, sodium, potassium or ammonium salts of alkyl sulfonates having 6 to 12 carbon atoms, sodium, potassium or ammonium salts of carboxylic acids having 6 to 12 carbon atoms, betaines having 1 to 8 carbon atoms, phosphate esters having 1 to 8 carbon atoms, and mixtures thereof. The hydrotrope may be present in the composition at a level of from about 5 wt. % to about 50 wt. %, wherein all weight percentages are percent by weight of the total composition.

The invention provides another composition for cleaning a membrane. The composition comprises: (i) a non-ionic surfactant having the formula: $R—O(CH_2CH_2O)_nH$, wherein R is a branched, substituted or unsubstituted, $C_{11-15}$ alkyl group, wherein n is an average degree of ethoxylation, wherein n is in the range of from 3 to 20; and (ii) at least one of the following: an additional non-ionic surfactant, a water soluble solvent, or a hydrotrope, wherein the composition has a gel point such that it will be in the liquid phase before and after dilution with any amount of water at all temperatures of 40° F. and above. In one version of the composition, R is a 100% branched, unsubstituted, $C_{13}$ alkyl group, and n is in the range of from 8 to 10. A cloud point of the composition may be in a range of 110° F. to 140° F. The non-ionic surfactant may have a distribution of ethoxylation having an upper limit of 20 moles. The non-ionic surfactant may be present in the composition at a level of from about 20 wt. % to about 90 wt. %, wherein all weight percentages are percent by weight of the total composition.

In one version of the composition, the composition comprises one or more additional non-ionic surfactants, each additional non-ionic surfactant having the Formula (I)

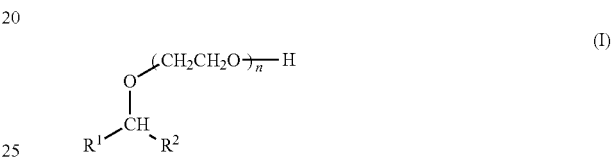

(I)

wherein n is an average degree of ethoxylation, wherein n is in the range of from 3 to 40, wherein $R^1$ is linear or branched, substituted or unsubstituted, saturated or unsaturated $C_1$-$C_{13}$ alkyl, wherein $R^2$ is linear or branched, substituted or unsubstituted, saturated or unsaturated $C_1$-$C_{13}$ alkyl, and wherein the total number of carbon atoms present in the $R^1$ and $R^2$ moieties is in the range of from 11 to 15.

Each additional non-ionic surfactant may have the formula: $C_{11-15}H_{23-31}O(CH_2CH_2O)_nH$ wherein n is in the range of from 6 to 10. Each additional non-ionic surfactant may have the Formula (II) below:

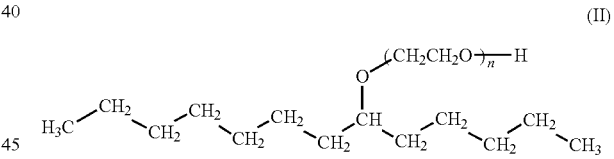

(II)

wherein n is in the range of from 6 to 10.

In one version of the composition, the composition includes two additional different non-ionic surfactants having the Formula (II) below:

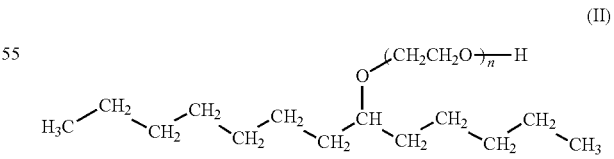

(II)

wherein n is in the range of from 6 to 10.

The one or more additional non-ionic surfactants may be present in the composition at a level of from about 10 wt. % to about 50 wt. %, wherein all weight percentages are percent by weight of the total composition.

In one version of the composition, the composition comprises a water soluble solvent. The solvent may be selected from the group consisting of $C_1$ to $C_6$ monohydric alcohols, $C_1$ to $C_6$ diols, alkylene glycols, $C_3$ to $C_{24}$ alkylene glycol ethers, and mixtures thereof. The solvent may be an alkylene glycol. The solvent may be present in the composition at a level of from about 5 wt. % to about 50 wt. %, wherein all weight percentages are percent by weight of the total composition.

In one version of the composition, the composition comprises a hydrotrope. The hydrotrope may be selected from the group consisting of sodium, potassium or ammonium salts of xylene sulfonate, sodium, potassium or ammonium salts of cumene sulfonate, sodium, potassium or ammonium salts of toluene sulfonate, sodium, potassium or ammonium salts of alkyl naphthalene sulfonates, sodium, potassium or ammonium salts of alkyl sulfonates having 6 to 12 carbon atoms, sodium, potassium or ammonium salts of carboxylic acids having 6 to 12 carbon atoms, betaines having 1 to 8 carbon atoms, phosphate esters having 1 to 8 carbon atoms, and mixtures thereof. The hydrotrope may be present in the composition at a level of from about 5 wt. % to about 50 wt. %, wherein all weight percentages are percent by weight of the total composition.

The invention provides a method for cleaning a membrane. In the method, the membrane is contacted with a composition comprising a non-ionic surfactant having the formula: $R-O(CH_2CH_2O)_nH$, wherein R is a branched, substituted or unsubstituted, $C_{11-15}$ alkyl group, wherein n is an average degree of ethoxylation, wherein n is in the range of from 3 to 20, and wherein an upper limit of a range of molecular weights of the surfactant is 1300 grams or below. The membrane may be fouled with a food, water, beverage, or brewery product. The membrane may be fouled with a dairy product.

The invention provides another method for cleaning a membrane. In the method, the membrane is contacted with a composition comprising a non-ionic surfactant having the formula: $R-O(CH_2CH_2O)_nH$, wherein R is a branched, substituted or unsubstituted, $C_{11-15}$ alkyl group, wherein n is an average degree of ethoxylation, wherein n is in the range of from 3 to 20, and wherein the composition has a gel point such that it will be in the liquid phase before and after dilution with any amount of water at all temperatures of 40° F. and above. The membrane may be fouled with a food, water, beverage, or brewery product. The membrane may be fouled with a dairy product.

These and other features, aspects, and advantages of the present invention will become better understood upon consideration of the following detailed description, drawings, and appended claims.

DETAILED DESCRIPTION OF THE INVENTION

Figure 1:
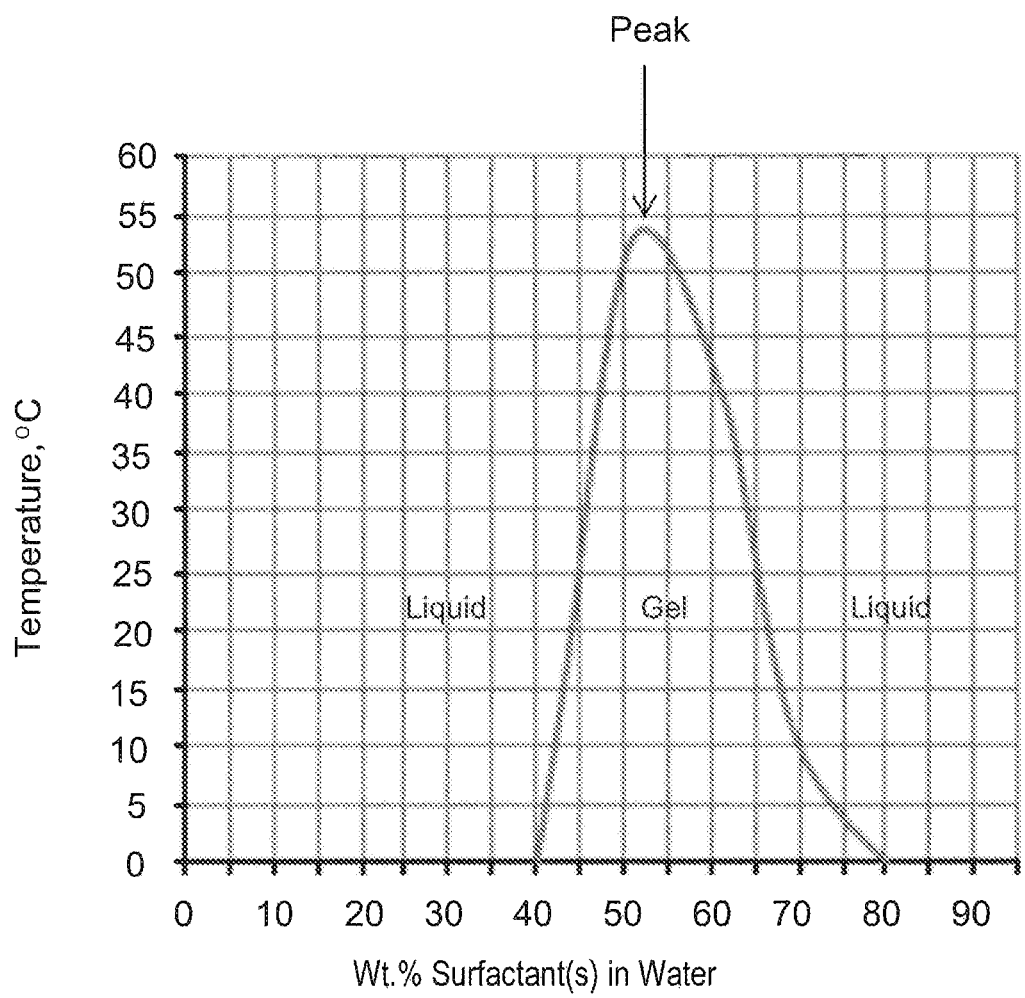
FIG. 1 is an example gel curve showing surfactant concentration in water vs. temperature.

The membrane cleaning compositions and methods of the invention are particularly beneficial in clean-in-place systems used for cleaning micro, ultra, nano and reverse osmosis filtration systems. Clean-in-place systems include the internal components of tanks, lines, pumps and other process equipment used for processing typically liquid product streams such as beverages, milk, and juices.

Various different treatment programs can be used to treat a membrane according to the method of the invention. The method for cleaning a membrane can include a plurality of steps. In a first step, a product (whey, milk, etc.) is removed from the filtration system. A fluid, such as water or gas, can be used to push the product from the membrane filtration system. A second step can be a pre-rinse step in which water can be circulated in the filtration system to remove large soils. A third step can be a membrane cleaning step in which a composition of the invention and an optional diluent, such as water, are circulated in the filtration system to clean any membranes of the filtration system. Compositions of the invention may be introduced during and/or prior to the cleaning step, and typically, a composition of the invention is diluted with water for the cleaning step.

A composition of the invention includes an alcohol ethoxylate non-ionic surfactant. One non-limiting example alcohol ethoxylate non-ionic surfactant is a branched alcohol ethoxylate having the formula: $R-O(CH_2CH_2O)_nH$ wherein R is a branched, substituted or unsubstituted, $C_{11-15}$ alkyl group and wherein n is the average degree of ethoxylation and n is in the range of from 3 to 20. Preferably, R is a branched, unsubstituted, $C_{11-15}$ alkyl group, and most preferably, R is a 100% branched, unsubstituted, $C_{13}$ alkyl group. Preferably, n is in the range of from 5 to 20; more preferably, n is in the range of from 7 to 11; and most preferably, n is in the range of from 8 to 10.

When synthesized, a sample of the branched alcohol ethoxylate non-ionic surfactant will have molecules of different molecular weights due to different degrees of ethoxylation for different molecules. This can be seen in that n is the average degree of ethoxylation. It has been discovered that branched alcohol ethoxylate non-ionic surfactants having a molecular weight within certain ranges have improved properties when used in a composition of the invention. Preferably, the upper limit of the range of molecular weights of the branched alcohol ethoxylate non-ionic surfactant is 1300 grams or below, or 1250 grams or below, or 1200 grams or below, or 1150 grams or below. The range of molecular weights of the branched alcohol ethoxylate non-ionic surfactant may be 350 to 1300 grams, or 350 to 1250 grams, or 350 to 1200 grams, or 350 to 1150 grams. Preferably, the branched alcohol ethoxylate non-ionic surfactant has a distribution of ethoxylation having an upper limit of 20 moles.

The alcohol ethoxylate non-ionic surfactant can be a tridecyl alcohol ethoxylate. Preferably, the tridecyl alcohol ethoxylate has a narrow cut of molar ethoxylation leading to the range of molecular weights described above. Alternate tridecyl alcohol ethoxylates with a standard bell curve of ethoxylation proved incompatible with membrane surfaces leading to cold water flux (water permeation through the membrane) drops after exposure. Preferably, the free ethylene oxide ($CH_2CH_2O$) content in the branched alcohol ethoxylate non-ionic surfactant is 1 ppm or less before use in preparing a composition of the invention.

The alcohol ethoxylate can be present in the composition at a level of from about 20 wt. % to about 90 wt. %, or at a level of from about 20 wt. % to about 50 wt. %, or at a level of from about 30 wt. % to about 40 wt. %, or at a level of from about 40 wt. % to about 80 wt. %, or at a level of from about 50 wt. % to about 70 wt. %, or at a level of from about 55 wt. % to about 65 wt. %, wherein all weight percentages are percent by weight of the total composition.

A composition of the invention may include one or more secondary alcohol ethoxylate non-ionic surfactants as additional non-ionic surfactant(s). One non-limiting example secondary alcohol ethoxylate has the Formula (I) below

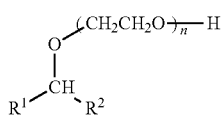

(I)

wherein n is the average degree of ethoxylation and is in the range of from 3 to 40; wherein $R^1$ is linear or branched, substituted or unsubstituted, saturated or unsaturated $C_1$-$C_{13}$ alkyl; wherein $R^2$ is linear or branched, substituted or unsubstituted, saturated or unsaturated $C_1$-$C_{13}$ alkyl; and wherein the total number of carbon atoms present in the $R^1$ and $R^2$ moieties is in the range of from 11 to 15. Preferably, the total number of carbon atoms present in the $R^1$ and $R^2$ moieties is in the range of from 12 to 14. Preferably, n is in the range of from 5 to 20; more preferably, n is in the range of from 6 to 10; and most preferably, n is in the range of from 7 to 9.

Another non-limiting example secondary alcohol ethoxylate has the formula: $C_{11-15}H_{23-31}O(CH_2CH_2O)_nH$ wherein n is the average degree of ethoxylation and is in the range of from 3 to 40. Preferably, n is in the range of from 5 to 20; more preferably, n is in the range of from 6 to 10; and most preferably, n is in the range of from 7 to 9.

Another non-limiting example secondary alcohol ethoxylate has the formula: $C_{12-14}H_{25-29}O(CH_2CH_2O)_nH$ wherein n is the average degree of ethoxylation and is in the range of from 3 to 40. Preferably, n is in the range of from 5 to 20; more preferably, n is in the range of from 6 to 10; and most preferably, n is in the range of from 7 to 9. Secondary alcohol ethoxylates having the formula $C_{12-14}H_{25-29}O(CH_2CH_2O)_nH$ wherein n is in the range of 3 to 40 are commercially available from The Dow Chemical Company under the trade name Tergitol™ 15-S Series.

Another non-limiting example secondary alcohol ethoxylate has the Formula (II) below:

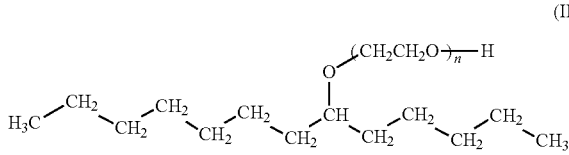

(II)

wherein n is the average degree of ethoxylation and is in the range of from 3 to 40. Preferably, n is in the range of from 5 to 20; more preferably, n is in the range of from 6 to 10; and most preferably, n is in the range of from 7 to 9. Secondary alcohol ethoxylates having Formula (II) wherein n is in the range of 3 to 40 are commercially available from The Dow Chemical Company under the trade name Tergitol™ 15-S Series. For example, Tergitol™ 15-S-7 has the Formula (II) wherein n is 7; and Tergitol™ 15-S-9 has the Formula (II) wherein n is 9.

The secondary alcohol ethoxylate(s) can be present in the composition at a level of from about 10 wt. % to about 50 wt. %, or at a level of from about 20 wt. % to about 45 wt. %, or at a level of from about 20 wt. % to about 30 wt. %, or at a level of from about 40 wt. % to about 50 wt. %, or at a level of from about 35 wt. % to about 45 wt. %, wherein all weight percentages are percent by weight of the total composition.

A composition of the invention may include one or more water soluble solvents. Non-limiting example solvents include $C_1$ to $C_6$ monohydric alcohols (for example, methanol, ethanol and/or isopropanol), $C_1$ to $C_6$ diols, alkylene glycols (for example, propylene glycol and ethylene glycol), and $C_3$ to $C_{24}$ alkylene glycol ethers (for example, ethylene glycol ether and propylene glycol ether). In one example embodiment, the solvent is propylene glycol. The solvent(s) can be present in the composition at a level of from about 5 wt. % to about 50 wt. %, or at a level of from about 10 wt. % to about 40 wt. %, or at a level of from about 10 wt. % to about 30 wt. %, or at a level of from about 15 wt. % to about 25 wt. %, wherein all weight percentages are percent by weight of the total composition.

A composition of the invention may include one or more hydrotropes. The term "hydrotrope" refers to a compound that increases the solubility of surfactants in water. Typically, hydrotropes include a hydrophilic part and a hydrophobic part wherein the hydrophobic part is generally too small to cause spontaneous self-aggregation. The hydrotrope, when used in the composition, modifies the gel point. Non-limiting example hydrotropes include: sodium, potassium or ammonium salts of xylene sulfonate; sodium, potassium or ammonium salts of cumene sulfonate; sodium, potassium or ammonium salts of toluene sulfonate; sodium, potassium or ammonium salts of alkyl naphthalene sulfonates; sodium, potassium or ammonium salts of alkyl sulfonates having 6 to 12 carbon atoms; sodium, potassium or ammonium salts of carboxylic acids having 6 to 12 carbon atoms; betaines having 1 to 8 carbon atoms; and phosphate esters having 1 to 8 carbon atoms. In one example embodiment, the hydrotrope is a sodium salt of xylene sulfonate. The hydrotrope can be present in the composition at a level of from about 5 wt. % to about 50 wt. %, or at a level of from about 10 wt. % to about 40 wt. %, or at a level of from about 10 wt. % to about 30 wt. %, or at a level of from about 15 wt. % to about 25 wt. %, wherein all weight percentages are percent by weight of the total composition.

A composition of the invention may include water. The water can be present in the composition at a level of from about 5 wt. % to about 50 wt. %, or at a level of from about 10 wt. % to about 40 wt. %, or at a level of from about 10 wt. % to about 30 wt. %, or at a level of from about 15 wt. % to about 25 wt. %, wherein all weight percentages are percent by weight of the total composition. In another version of the composition, the composition does not include water.

Gel Characteristics—Compositions including one or more ethoxylated non-ionic surfactants can often form gels depending on the concentration of the ethoxylated non-ionic surfactant(s) in water. Gelling characteristics are depicted in temperature vs. surfactant concentration plots called gel curves. Surfactant concentration in water from 0 weight percent to 100 weight percent is typically placed on the x-axis, and temperature (° F. or ° C.) is typically placed on the y-axis. An example gel curve is shown in FIG. 1 (which is not specifically directed to any composition described herein). At a selected surfactant concentration and temperature, the mixture of water and surfactant(s) will be in a liquid phase or a gel phase, and the gel curve shows what phase will occur at the selected surfactant concentration and temperature. It can be seen in FIG. 1 that the gel curve typically will have a peak. Above the temperature corresponding to the peak of the gel curve, the mixture of water and surfactant (s) will be in a liquid phase at all surfactant concentrations in water. Thus, at a certain temperature, the gel phase can be avoided at all surfactant concentrations. Preferably, a composition of the invention will be in the liquid phase at all temperatures of 40° F. and above, or all temperatures of 45° F. and above, or all temperatures of 50° F. and above, or all temperatures of 55° F. and above, or all temperatures of 60° F. and above, or all temperatures of 65° F. and above, or all temperatures of 70° F. and above, or all temperatures of 80° F. and above, or all temperatures of 90° F. and above, or all temperatures of 100° F. and above, or all temperatures of 110° F. and above, or all temperatures of 120° F. and above, or all temperatures of 130° F. and above, or all temperatures of 140° F. and above, or all temperatures of 150° F. and above.

Cloud Point—Cloud point is the temperature above which an aqueous solution including one or more water-soluble surfactants becomes turbid. In one example version of the composition of the invention, the cloud point is in the range of 110° F. to 140° F. In one example version of the composition of the invention, the cloud point is in the range of 120° F. to 140° F. Preferably, a composition of the invention has a cloud point of at least 130° F. In one example version of the composition of the invention, the cloud point is in the range of 130° F. to 140° F. In another example version of the composition of the invention, the cloud point is in the range of 130° F. to 135° F. The use of an alcohol ethoxylate having a narrow cut of molar ethoxylation provides for improved control over the cloud point of the composition.

EXAMPLES

The following Examples have been presented in order to further illustrate the invention and are not intended to limit the invention in any way.

Example 1

Figure 2:
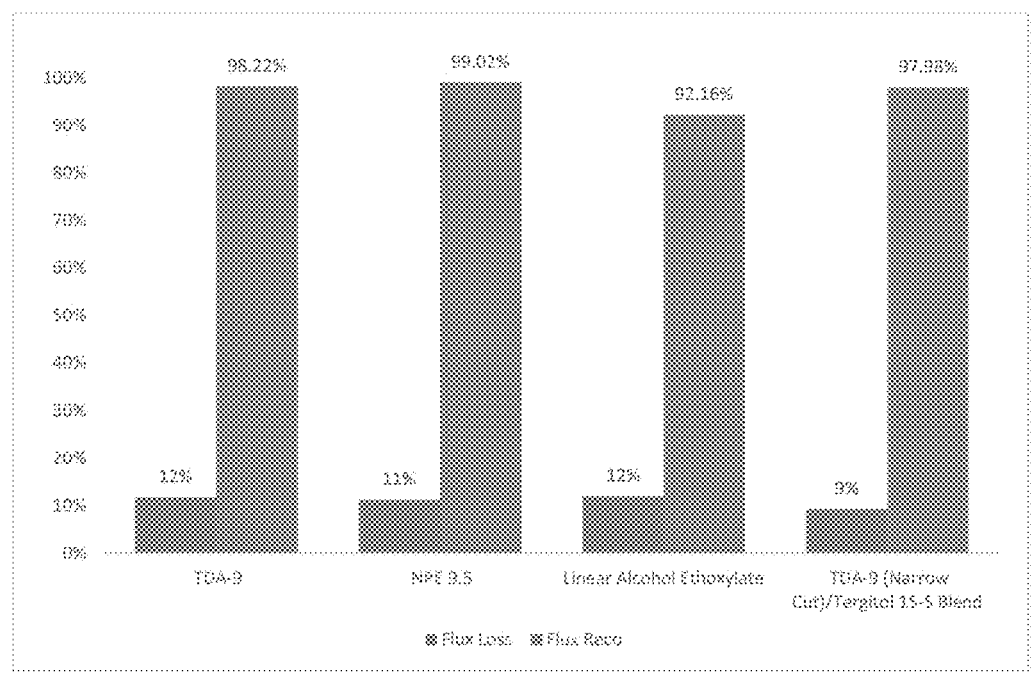
FIG. 2 is a bar graph showing membrane flux recovery results of tests comparing a composition of the invention to other formulations.

Membrane flux recovery tests were performed comparing a composition of the invention (Formulation No. 4) to other formulations. In the membrane flux recovery tests, a pilot membrane system was used to verify membrane chemical compatibility. The pilot system consisted of membrane housing to hold either a 4" or 8" spiral wound membrane element. This housing was plumbed to a balance tank and high pressure pump with associated valves. Spiral wound elements were exposed to cleaning protocols that are consistent with field methodologies with regards to flow and pressure. After cleaning cycles were complete, the membrane element was rinsed and the cold water flux rate was measured. This flux (permeate flow rate) is used to measure or evaluate the compatibility (rinsing recovery characteristics) of a particular chemistry. The results of the membrane flux recovery tests are shown in TABLE 1 and FIG. 2. In FIG. 2, Flux Loss % During Wash Cycle is the left bar in each group and Flux Recovery after rinse is the right bar in each group

TABLE 1

| Formulation | Initial Flux | Flux Loss | Flux Loss % During Wash Cycle | Flux Recovery after rinse |
|---|---|---|---|---|
| No. 1 - TDA-9 | 15818 | 1870 | 12% | 98.22% |
| No. 2 - NPE 9.5 | 15436 | 1744 | 11% | 99.02% |
| No. 3 - Linear Alcohol Ethoxylate | 15436 | 1846 | 12% | 92.16% |
| No. 4 - TDA-9 (Narrow Cut)/ Tergitol ™ 15-S Blend | 15436 | 1432 | 9% | 97.98% |

Formulation No. 1 included 100% TDA-9, a branched tridecyl alcohol ethoxylate having the formula: R—O(CH$_2$CH$_2$O)$_n$H wherein R is a 100% branched, unsubstituted, C$_{13}$ alkyl group and having an average degree of ethoxylation of 9 moles and having a range of molecular weights of 394 to 1406 grams as measured using Liquid Chromatography with Mass Spectrometry detection (LC/MS) with a dilution of the sample with MilliQ water and a retention time of 3.20 minutes. LC/MS identified the alcohol ethoxylate as having a maximum degree of ethoxylation of 23 moles.

Formulation No. 2 included 100% of a nonylphenol ethoxylate having an average degree of ethoxylation of 9.5 moles.

Formulation No. 3 included 100% of a blend of Tomadol® 91-6 and Tomadol® 91-2.5 having an average degree of ethoxylation of 5.125 moles wherein Tomadol® 91-6 has the formula R"—O(CH$_2$CH$_2$O)$_n$H wherein R" is a distribution of linear C$_9$/C$_{10}$/C$_{11}$ alkyl groups and n is an average degree of ethoxylation of 6 moles, and Tomadol® 91-2.5 has the formula R"—O(CH$_2$CH$_2$O)$_n$H wherein R" is a distribution of linear C$_9$/C$_{10}$/C$_{11}$ alkyl groups and n is an average degree of ethoxylation of 2.5 moles. Tomadol® 91-6 and Tomadol® 91-2.5 are available from Air Products and Chemicals, Inc., Allentown, Pa.

Formulation No. 4 included: (1) 16.0 wt. % Tergitol™ 15-S-7 which has Formula (II) above wherein n is 7; (2) 24.0 wt. % Tergitol™ 15-S-9 which has Formula (II) above wherein n is 9; and (3) 60.0 wt. % TDA-9 (Narrow Cut), a branched tridecyl alcohol ethoxylate having the formula: R—O(CH$_2$CH$_2$O)$_n$H wherein R is a 100% branched, unsubstituted, C$_{13}$ alkyl group and having an average degree of ethoxylation of 9 moles and having a range of molecular weights of 394 to 1142 grams as measured using LC/MS with a dilution of the sample with MilliQ water and a retention time of 3.20 minutes, wherein all weight percentages are percent by weight of the total composition. LC/MS identified the alcohol ethoxylate as having a maximum degree of ethoxylation of 17 moles. Formulation No. 4 is a non-limiting example composition of the invention.

As shown in TABLE 1 and FIG. 2, Formulation No. 4, a non-limiting example composition of the invention, exhibited less flux loss during a wash cycle. Formulation No. 4 showed performance on par with Formulation No. 2 (the NPE standard).

Formulation No. 4 is in the liquid phase at all temperatures of 40° F. and above, and has a cloud point in the range of 120° F. to 130° F.

Example 2

Draves wetting tests were performed on various formulations. A Draves wetting test is a test of the efficiency of a wetting agent based on the time required for a standard skein of cotton yarn carrying a standard weight to sink in a water solution of that wetting agent. The test conditions were: 40 gram lead weight; 1.5 gram copper S-Hook; Fishing string; 1000 milliliter graduated cylinder; deionized water; temperature=75° F., and 4 gram skein.

The formulations tested were:

NPE 9.5: 100% of a nonylphenol ethoxylate having an average degree of ethoxylation of 9.5 moles;

Formulation No. 4 described above at a 100% actives level;

Formulation No. 4 described above at a 75% actives level, i.e., 75% Formulation No. 4 and 25% water;

Formulation No. 5: 36 wt. % of a branched tridecyl alcohol ethoxylate having the formula: R—O(CH$_2$CH$_2$O)$_n$H wherein R is a 100% branched, unsubstituted, C$_{13}$ alkyl group and having an average degree of ethoxylation of 9 moles and having a range of molecular weights of 394 to 1142 grams as measured using LC/MS with a dilution of the sample with MilliQ water and a retention time of 3.20 minutes and having a maximum degree of ethoxylation of 17 moles as measured by LC/MS; 14.4 wt. % Tergitol™ 15-S-9 which has Formula (II) above wherein n is 9; 9.6 wt. % Tergitol™ 15-S-7 which has Formula (II) above wherein n is 7; 20 wt. % propylene glycol; and 20 wt. % water. Formulation No. 5 is a non-limiting example composition of the invention. Formulation No. 5 has a gel point such that it will be in the liquid phase when diluted with any amount of water at all temperatures of 40° F. and above.

Formulation No. 6: Formulation No. 5 described above at a 75% actives level, i.e., 75% Formulation No. 5 and 25% water;

Formulation No. 7: Formulation No. 5 described above at a 60% actives level, i.e., 60% Formulation No. 5 and 40% water;

Formulation No. 8 is a branched tridecyl alcohol ethoxylate having the formula: R—O(CH$_2$CH$_2$O)$_n$H wherein R is a 100% branched, unsubstituted, C$_{13}$ alkyl group and having an average degree of ethoxylation of 9 moles and having a range of molecular weights of 394 to 1142 grams as measured using LC/MS with a dilution of the sample with MilliQ water and a retention time of 3.20 minutes at a 100% actives level and having a maximum degree of ethoxylation of 17 moles as measured by LC/MS;

Lutensol™ TDA-9: 100% TDA-9, is available from BASF and is a branched tridecyl alcohol ethoxylate having the formula: R—O(CH$_2$CH$_2$O)$_n$H wherein R is a 100% branched, unsubstituted, C$_{13}$ alkyl group and having an average degree of ethoxylation of 9 moles and having a range of molecular weights of 394 to 1318 grams as measured using Liquid Chromatography with Mass Spectrometry detection (LC/MS) with a dilution of the sample with MilliQ water and a retention time of 3.20 minutes and having a maximum degree of ethoxylation of 21 moles as measured by LC/MS.

Tergitol™ 15-S-9 which has the Formula (II) above wherein n is 9 at a 100% actives level; and Tergitol™ 15-S-7 which has the Formula (II) above wherein n is 7 at a 100% actives level.

The term "actives" refers to the concentration of those ingredients involved in cleaning excluding inert ingredients such as water.

Figure 3:
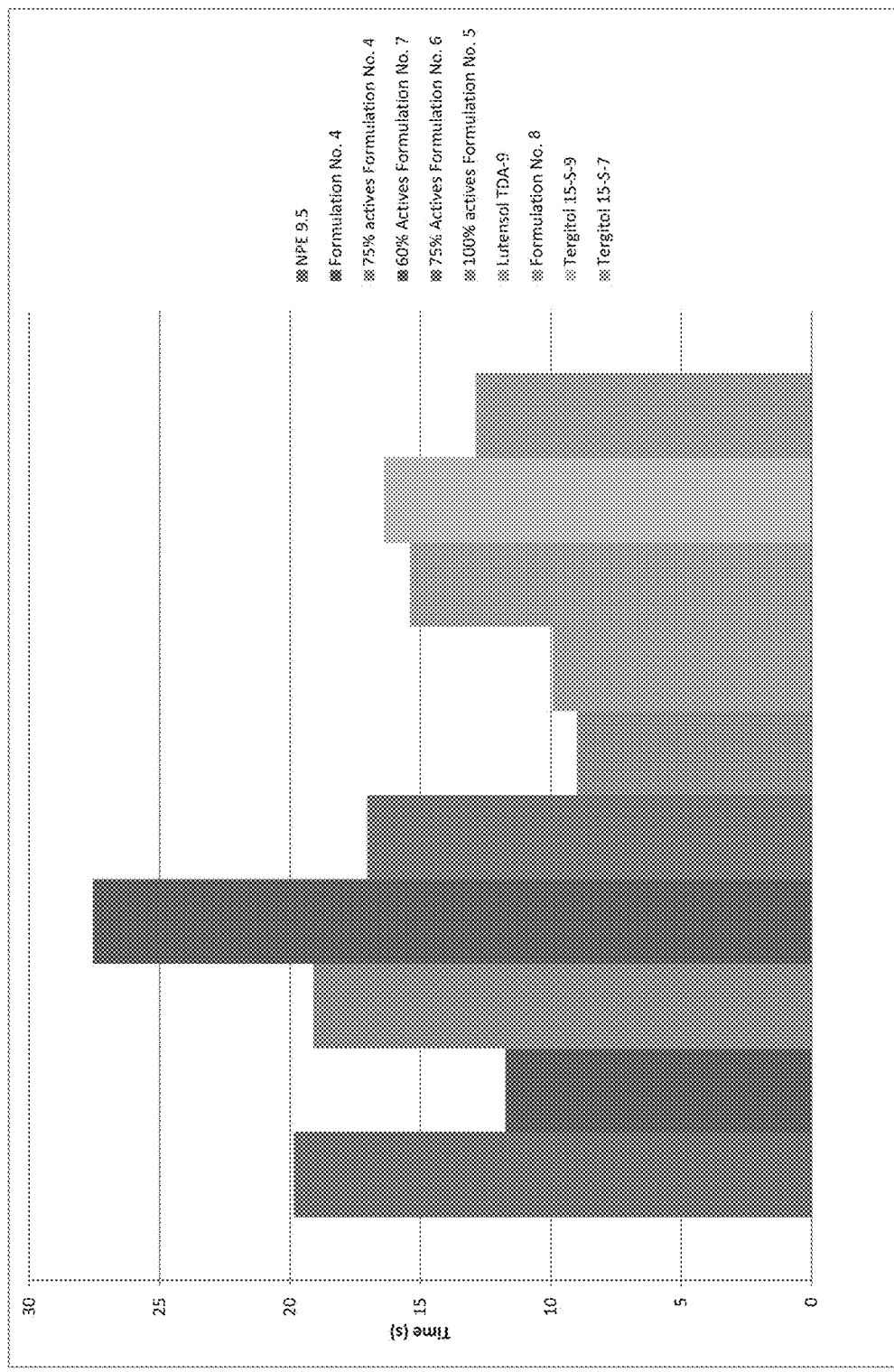
FIG. 3 is a bar graph showing Draves wetting tests comparing compositions of the invention to other formulations. The bars reading left to right in the graph are in the same order as the right hand legend reading top to bottom.

As shown in TABLE 2 below and FIG. 3, Formulation Nos. 4, 5, 6 and 8 had better wetting times than 100% of a nonylphenol ethoxylate having an average degree of ethoxylation of 9.5 moles (NPE 9.5).

The benefits on a non-gelling formulation, such as Formulation No. 5, are that it more quickly disperses in water so it does not block dosing equipment tubing due to improved dispersing properties, and it is faster wetting and can be used at lower concentrations to achieve the same wetting performance. We have also used glycol ethers and hydrotropes like sodium xylene sulfonate to prevent gelling of the alcohol ethoxylates.

TABLE 2

| | Formulation | | | | | |
|---|---|---|---|---|---|---|
| | NPE 9.5 | 100% actives Formulation No. 4 | 75% actives Formulation No. 4 | 60% Actives Formulation No. 7 | 75% Actives Formulation No. 6 | 100% actives Formulation No. 5 |
| | 0.78 g/Liter 75° F. | 0.78 g/liter 75° F. | 0.58 g/Liter | 0.78 g/liter | 0.98 g/liter | 1.30 g/Liter |
| Test Replicate | Sink Time | Sink Time | | | | |
| 1 | 23.40 | 13.10 | 16.84 | 27.60 | 17.60 | 9.00 |
| 2 | 18.00 | 12.13 | 16.15 | 26.30 | 17.56 | |
| 3 | 21.25 | 10.00 | 21.38 | 28.79 | 18.31 | |
| 4 | 19.56 | | 20.04 | | 14.81 | |
| 5 | 16.97 | | 21.03 | | 17.03 | |
| Average | 19.836 | 11.74333333 | 19.088 | 27.56333333 | 17.062 | 9 |
| Standard Deviation | 2.56722223 | 1.585759545 | 2.429829212 | 1.245404887 | 1.338607485 | — |

| | Formulation | | | |
|---|---|---|---|---|
| | 100% Actives Lutensol™ TDA-9 | 100% Actives Formulation No. 8 | 100% Actives Tergitol™ 15-S-9 | 100% Actives Tergitol™ 15-S-7 |

TABLE 2-continued

|  | 0.78 g/liter | 0.78 g/liter | 0.78 g/liter | 0.78 g/liter |  |
| --- | --- | --- | --- | --- | --- |
| Test Replicate |  |  |  |  |  |
| 1 | 10.65 | 12.91 | 16.87 | 11.35 |  |
| 2 | 9.72 | 13.31 | 16.88 | 14.41 |  |
| 3 | 9.41 | 19.94 | 15.38 | 12.87 |  |
| 4 |  |  |  |  |  |
| 5 |  |  |  |  |  |
| Average | 9.926666667 | 15.38666667 | 16.37666667 | 12.87666667 | 14.88 |
| Standard Deviation | 0.64531646 | 3.948370972 | 0.863153134 | 1.530010893 | 2.666491 |

Example 3

Draves wetting tests were performed on various formulations. A Draves wetting test is a test of the efficiency of a wetting agent based on the time required for a standard skein of cotton yarn carrying a standard weight to sink in a water solution of that wetting agent. The test conditions were: 40 gram lead weight; 1.5 gram copper S-Hook; Fishing string; 1000 milliliter graduated cylinder; deionized water; temperature=40° F., and 4 gram skein.

Figure 4:
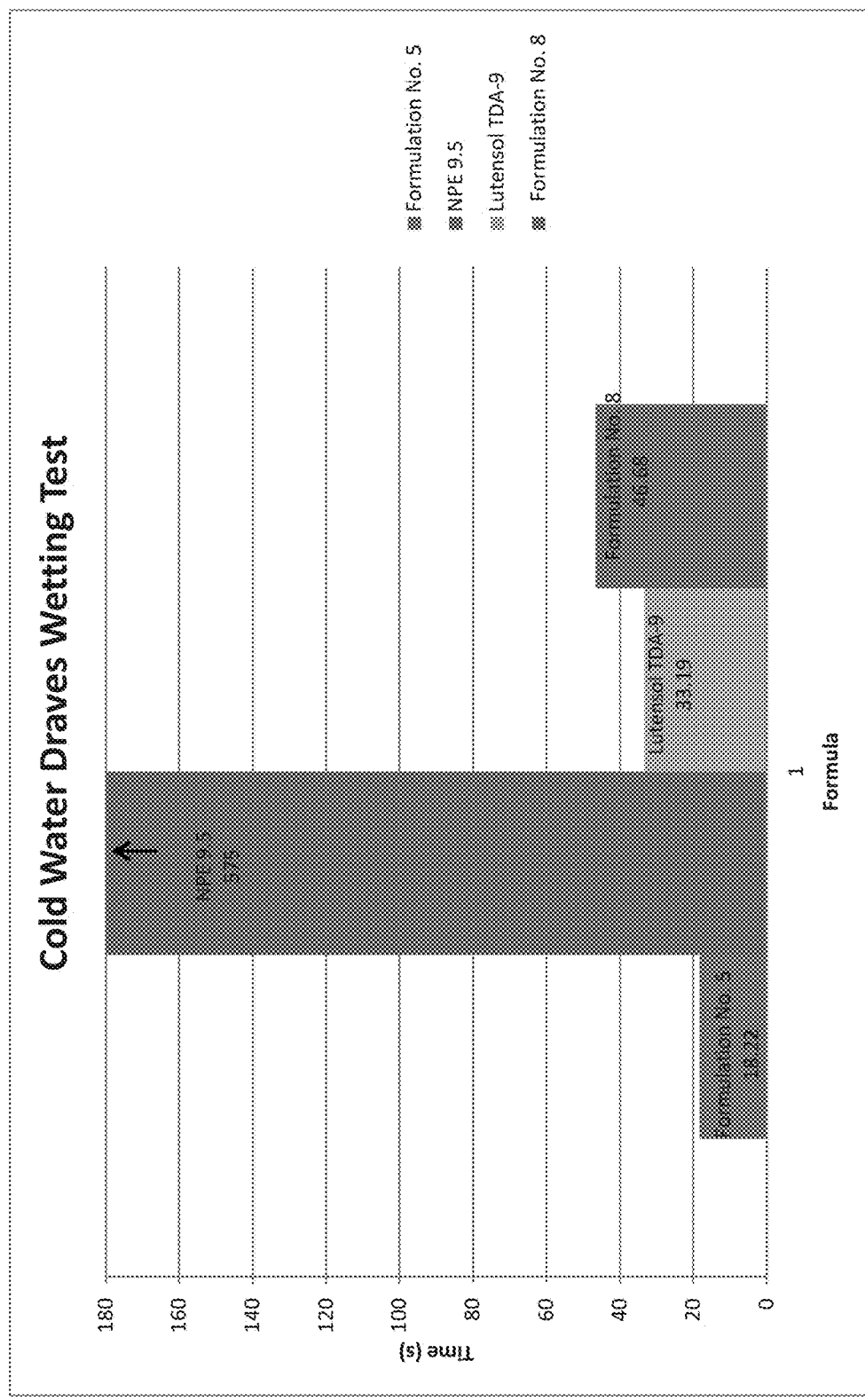
FIG. 4 shows is a bar graph showing Draves wetting tests comparing compositions of the invention to other formulations. The bars reading left to right in the graph are in the same order as the right hand legend reading top to bottom.

The formulations tested were:
i. Formulation No. 5 as described above in Example 2 at a 100% actives level;
ii. NPE 9.5: 100% of a nonylphenol ethoxylate having an average degree of ethoxylation of 9.5 moles;
iii. Lutensol™ TDA-9 as described above in Example 2 at a 100% actives level;
iv. Formulation No. 8 as described above in Example 2 at a 100% actives level;

As shown in TABLE 3 below and FIG. 4, Formulation Nos. 5 and 8 had better wetting times than 100% of a nonylphenol ethoxylate having an average degree of ethoxylation of 9.5 moles (NPE 9.5).

TABLE 3

| 40° F. Draves wetting test |  |
| --- | --- |
| Formulation | Time (s) |
| Formulation No. 5 | 18.22 |
| NPE 9.5 | 575 |
| Lutensol ™ TDA-9 | 33.19 |
| Formulation No. 8 | 46.68 |

Thus, the invention provides compositions and methods for cleaning membranes used in separation facilities, such as facilities that clarify, concentrate and/or fractionate a variety of dairy products.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for cleaning a membrane, the method comprising:
   contacting the membrane with a composition comprising a first non-ionic surfactant having the formula: R—O(CH$_2$CH$_2$O)$_n$H,
   wherein R in the first non-ionic surfactant is a branched, substituted or unsubstituted, C$_{11-15}$ alkyl group,
   wherein n in the first non-ionic surfactant is an average degree of ethoxylation,
   wherein n in the first non-ionic surfactant is in the range of from 3 to 20, and
   wherein an upper limit of a range of molecular weights of the first non-ionic surfactant is 1300 grams or below, and
   wherein the composition comprises one or more additional non-ionic surfactants, and each additional non-ionic surfactant has the formula:

C$_{11-15}$H$_{23-31}$O(CH$_2$CH$_2$O)$_n$H wherein n in each additional non-ionic surfactant is the average degree of ethoxylation and is in the range of from 3 to 40, and
   wherein the one or more additional non-ionic surfactants are present in the composition at a level of from about 20 wt. % to about 50 wt. %, wherein all weight percentages are percent by weight of the total composition.

2. The method of claim 1 wherein:
   the composition further comprises at least one of the following: a water soluble solvent, or a hydrotrope.

3. The method of claim 1 wherein:
   R in the first non-ionic surfactant is a 100% branched, unsubstituted, C$_{13}$ alkyl group, and
   n is in the range of from 8 to 10.

4. The method of claim 1 wherein:
   a cloud point of the composition is in a range of 110° F. to 140° F.

5. The method of claim 1 wherein:
   the first non-ionic surfactant has a distribution of ethoxylation having an upper limit of 20 moles.

6. The method of claim 1 wherein:
   the first non-ionic surfactant is present in the composition at a level of from about 20 wt. % to about 90 wt. %, wherein all weight percentages are percent by weight of the total composition.

7. The method of claim 1 wherein:
   each additional non-ionic surfactant has the Formula (II) below:

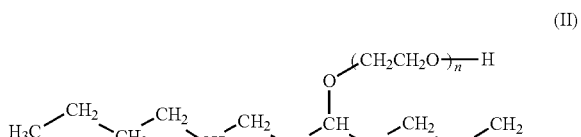

(II)

wherein n is in the range of from 6 to 10.

8. The method of claim 1 wherein:
the composition includes two additional different non-ionic surfactants having the Formula (II) below:

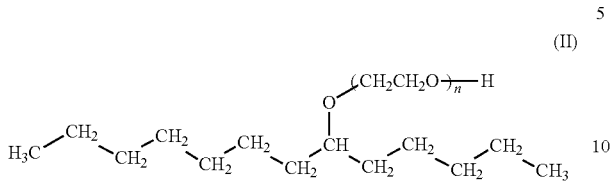

(II)

wherein n is in the range of from 6 to 10.

9. The method of claim 1 wherein:
the one or more additional non-ionic surfactants are present in the composition at a level of from about 30 wt. % to about 50 wt. %, wherein all weight percentages are percent by weight of the total composition.

10. The method of claim 1 wherein:
the composition comprises a water soluble solvent.

11. The method of claim 10 wherein:
the solvent is selected from the group consisting of $C_1$ to $C_6$ monohydric alcohols, $C_1$ to $C_6$ diols, alkylene glycols, $C_3$ to $C_{24}$ alkylene glycol ethers, and mixtures thereof.

12. The method of claim 10 wherein:
the solvent is an alkylene glycol.

13. The method of claim 10 wherein:
the solvent is present in the composition at a level of from about 5 wt. % to about 50 wt. %, wherein all weight percentages are percent by weight of the total composition.

14. The method of claim 1 wherein:
the composition comprises a hydrotrope.

15. The method of claim 14 wherein:
the hydrotrope is selected from the group consisting of sodium, potassium or ammonium salts of xylene sulfonate, sodium, potassium or ammonium salts of cumene sulfonate, sodium, potassium or ammonium salts of toluene sulfonate, sodium, potassium or ammonium salts of alkyl naphthalene sulfonates, sodium, potassium or ammonium salts of alkyl sulfonates having 6 to 12 carbon atoms, sodium, potassium or ammonium salts of carboxylic acids having 6 to 12 carbon atoms, betaines having 1 to 8 carbon atoms, phosphate esters having 1 to 8 carbon atoms, and mixtures thereof.

16. The method of claim 14 wherein:
the hydrotrope is present in the composition at a level of from about 5 wt. % to about 50 wt. %, wherein all weight percentages are percent by weight of the total composition.

17. The method of claim 1 wherein:
the membrane is fouled with a food, water, beverage, or brewery product.

18. The method of claim 1 wherein:
the membrane is fouled with a dairy product.

19. A method for cleaning a membrane, the method comprising:
contacting the membrane with a composition comprising a first non-ionic surfactant having the formula: R—O($CH_2CH_2O)_nH$,
wherein R in the first non-ionic surfactant is a branched, substituted or unsubstituted, $C_{11-15}$ alkyl group,
wherein n in the first non-ionic surfactant is an average degree of ethoxylation,
wherein n in the first non-ionic surfactant is in the range of from 3 to 20, and
wherein the composition has a gel point such that it will be in the liquid phase before and after dilution with any amount of water at all temperatures of 40° F. and above, and
wherein the composition comprises one or more additional non-ionic surfactants, and each additional non-ionic surfactant has the formula:

$$C_{11-15}H_{23-31}O(CH_2CH_2O)_nH$$

wherein n in each additional non-ionic surfactant is the average degree of ethoxylation and is in the range of from 3 to 40, and
wherein the one or more additional non-ionic surfactants are present in the composition at a level of from about 20 wt. % to about 50 wt. %, wherein all weight percentages are percent by weight of the total composition.

20. The method of claim 19 wherein:
the composition further comprises at least one of the following: a water soluble solvent, or a hydrotrope.

21. The method of claim 20 wherein:
R in the first non-ionic surfactant is a 100% branched, unsubstituted, $C_{13}$ alkyl group, and
n in the first non-ionic surfactant is in the range of from 8 to 10.

22. The method of claim 20 wherein:
a cloud point of the composition is in a range of 110° F. to 140° F.

23. The method of claim 20 wherein:
the first non-ionic surfactant has a distribution of ethoxylation having an upper limit of 20 moles.

24. The method of claim 20 wherein:
the first non-ionic surfactant is present in the composition at a level of from about 20 wt. % to about 90 wt. %, wherein all weight percentages are percent by weight of the total composition.

25. The method of claim 19 wherein:
each additional non-ionic surfactant has the Formula (II) below:

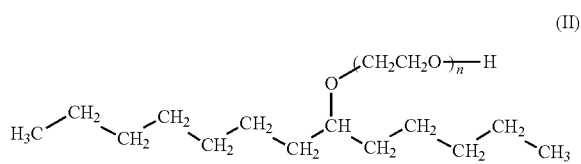

(II)

wherein n is in the range of from 6 to 10.

26. The method of claim 19 wherein:
the composition includes two additional different non-ionic surfactants having the Formula (II) below:

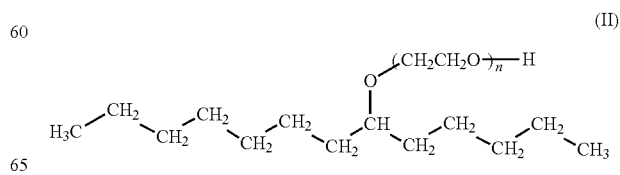

(II)

wherein n is in the range of from 6 to 10.

27. The method of claim 19 wherein:
the one or more additional non-ionic surfactants are present in the composition at a level of from about 30 wt. % to about 50 wt. %, wherein all weight percentages are percent by weight of the total composition.

28. The method of claim 20 wherein:
the composition comprises a water soluble solvent.

29. The method of claim 28 wherein:
the solvent is selected from the group consisting of $C_1$ to $C_6$ monohydric alcohols, $C_1$ to $C_6$ diols, alkylene glycols, $C_3$ to $C_{24}$ alkylene glycol ethers, and mixtures thereof.

30. The method of claim 28 wherein:
the solvent is an alkylene glycol.

31. The method of claim 28 wherein:
the solvent is present in the composition at a level of from about 5 wt. % to about 50 wt. %, wherein all weight percentages are percent by weight of the total composition.

32. The method of claim 20 wherein:
the composition comprises a hydrotrope.

33. The method of claim 32 wherein:
the hydrotrope is selected from the group consisting of sodium, potassium or ammonium salts of xylene sulfonate, sodium, potassium or ammonium salts of cumene sulfonate, sodium, potassium or ammonium salts of toluene sulfonate, sodium, potassium or ammonium salts of alkyl naphthalene sulfonates, sodium, potassium or ammonium salts of alkyl sulfonates having 6 to 12 carbon atoms, sodium, potassium or ammonium salts of carboxylic acids having 6 to 12 carbon atoms, betaines having 1 to 8 carbon atoms, phosphate esters having 1 to 8 carbon atoms, and mixtures thereof.

34. The method of claim 32 wherein:
the hydrotrope is present in the composition at a level of from about 5 wt. % to about 50 wt. %, wherein all weight percentages are percent by weight of the total composition.

35. The method of claim 19 wherein:
the membrane is fouled with a food, water, beverage, or brewery product.

36. The method of claim 19 wherein:
the membrane is fouled with a dairy product.

\* \* \* \* \*